United States Patent [19]

Allen

[11] 3,971,340

[45] July 27, 1976

[54] LIMIT AND CONTROL FEEDER FOR ANIMALS

[75] Inventor: Dee Dexter Allen, Zeeland, Mich.

[73] Assignee: U.S. Industries, Inc., New York, N.Y.

[22] Filed: Aug. 19, 1974

[21] Appl. No.: 498,364

[52] U.S. Cl............... 119/52 AF; 119/53; 119/56 R
[51] Int. Cl.² ......................................... A01K 5/00
[58] Field of Search ........... 119/52 AF, 52 B, 52 R, 119/56 R, 53, 21, 22, 28

[56] References Cited
UNITED STATES PATENTS

| 3,144,173 | 8/1964 | France et al. | 119/56 R |
| 3,180,318 | 4/1965 | Fisher | 119/56 R |
| 3,254,729 | 6/1966 | Behlen | 119/56 R |
| 3,811,412 | 5/1974 | Murto et al. | 119/53 |

*Primary Examiner*—Louis G. Mancene
*Assistant Examiner*—J. N. Eskovitz
*Attorney, Agent, or Firm*—Price, Heneveld, Huizenga & Cooper

[57] ABSTRACT

A plurality of feed pan assemblies are attached beneath a feed trough connected to a supply hopper, the trough having an internal conveyor for moving feed therealong. Each assembly includes a container suspended intermediate the trough and pan which are pre-filled with feed dispensed from the trough. The bottom of each container is closed by a gate during filling of the container, the gates being simultaneously opened by an actuator which provides simultaneously premeasured dispensing of feed into the desired number of feeder pans. Preferably, the gate is cone-shaped.

13 Claims, 5 Drawing Figures

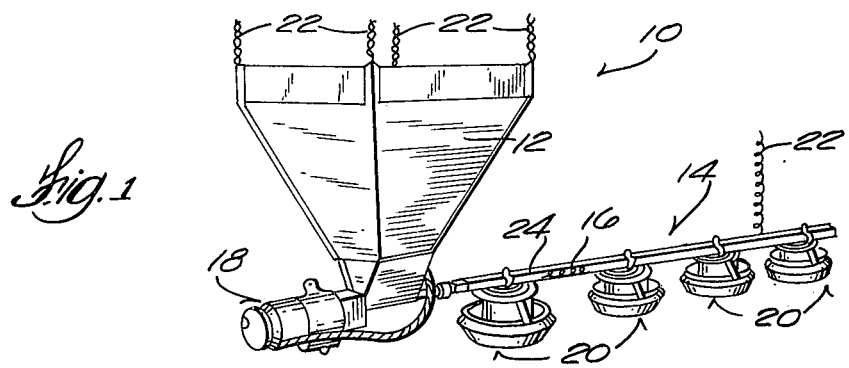
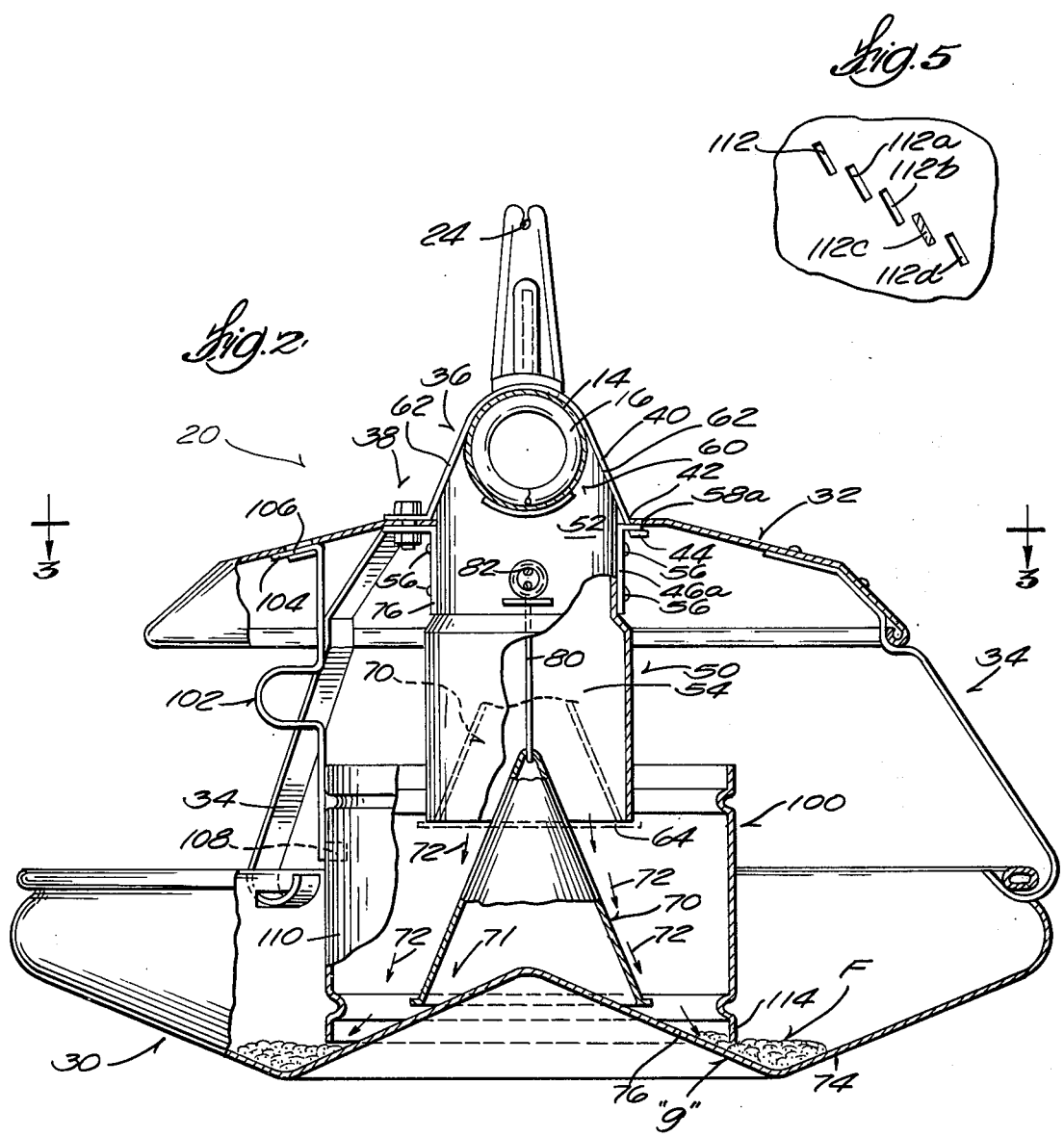

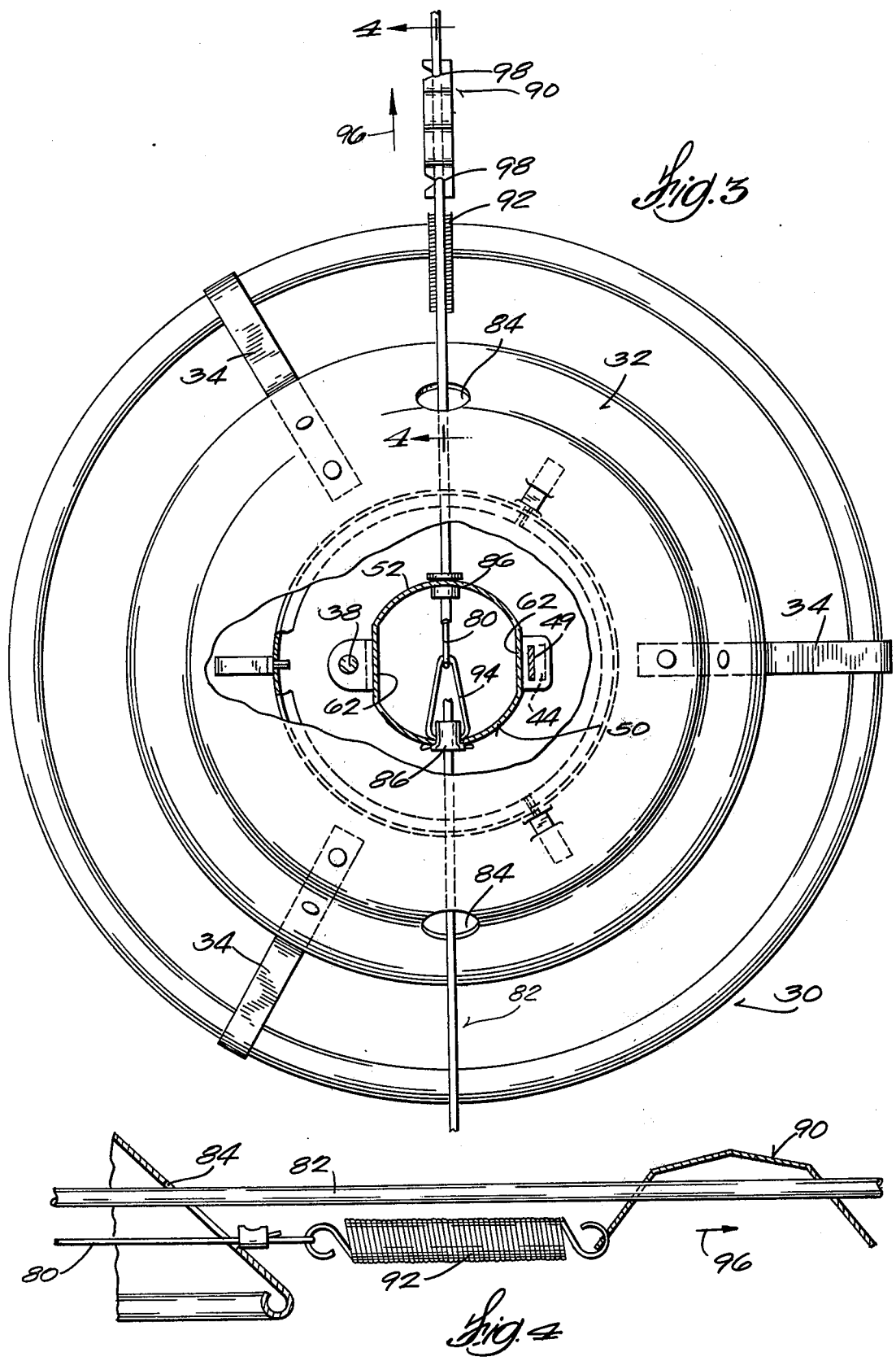

LIMIT AND CONTROL FEEDER FOR ANIMALS

BACKGROUND OF THE INVENTION

I. Field of Invention

This invention relates to systems for the automated feeding of poultry and the like, and more particularly to systems of this type which have a plurality of individual feeder pans, to which feed is supplied from a feed trough having an internal conveyor means.

II. Description of the Prior Art

Automated feeding systems have been in use for sometime which include a supply hopper, a feed trough having an internal conveyor means such as an auger or the like, and a plurality of feeder pans attached to the trough and located immediately therebeneath for receiving feed from the trough generally through an opening in the bottom of the trough located above each feeder pan. Feeder pan systems of this nature generally have a dished or concave lower portion which holds the feed so that it is accessible to the poultry or animals being fed, such feeder pans often having a generally enclosed upper portion communicating with the feeder trough through an opening therein for supplying feed to the aforementioned dish-shaped lower portion from the trough. Generally, means are provided at the end of the trough to shut the internal conveyor means down when the feeders are full. A representation of some highly developed prior art assemblies which have worked quite successfully is shown in commonly assigned U.S. Pat. No. 3,566,843, entitled POULTRY FEEDER PAN FOR AUGERTYPE FEEDERS, issued Mar. 2, 1971; U.S. Pat. No. 3,530,833, entitled ANIMAL FEEDER WITH SAFETY SHUT-OFF, issued Sept. 29, 1970; U.S. Pat. No. 3,490,419, entitled POULTRY AND ANIMAL FEEDER APPARATUS, issued Jan. 20, 1970; and U.S. Pat. No. 3,349,753, entitled AUTOMATIC WEIGHT OPERATED POULTRY FEEDING DEVICE, issued Oct. 31, 1967.

A particular disadvantage of the automated feeding systems in use today is that when feed is being dispensed into the feeder pans, the feeder pan closest to the source of feed begins filling first and each subsequently spaced feeder pan then sequentially begins to fill up. In a large poultry environment, this causes extreme difficulties in that the poultry immediately flock to the first available source of feed. Only the stronger and more aggressive bird succeeds in reaching a space to feed from and the lesser aggressive birds become confused and in fact end up not feeding even though feed is then available in subsequent spaced pans. Thus, inefficient irregular feeding results. A related problem is that existing systems do not provide a means for supplying measured amounts of feed to be equally distributed amongst the poultry present over preselected time intervals. It is becoming ever more apparent that a particulary effective method of raising poultry is to supply the poultry small predetermined amounts of feed intermittently so that the bird is continually fed but at the same time is continually hungry. This method of raising poultry has been found to be not only economical in the sense of maximum utilization of feed, but also has produced a productive broiler or layer in as short of time as heretofore possible. Current feeding systems however do not provide an adequate means to provide sequential intermittent feeding of preselected amounts over preselected time intervals. Current systems also are disadvantageous with regards to flexibility and ease of adjustment to fit changing requirements. Thus, there is a need in this art for an improved automated feeding system of the type described.

SUMMARY OF THE INVENTION

The automated feeding system of the invention preferably includes a feed storage hopper means, a feed trough communicating with the hopper means and extending outwardly therefrom, means for moving feed through the trough and a desired number of dish-like feeder pans mounted beneath the feed trough by a frame means. In accordance with the invention, a container is positioned above each pan beneath the trough and initially prefilled from the trough. Each container has a bottom opening positioned above each pan bottom and a gate means movable relative each opening between a closed position and an opened position permitting feed to drop from the container into the pan. Actuator means are provided for the gate means such that a preselected volume of feed may be simultaneously deposited in each pan when desired. Once the feed is deposited, the gate means are closed and the containers refilled for the next feeding cycle.

One significant advantage of the invention is that in a particular system with a particular plurality of feeder pans suspended beneath the trough, equal amounts of food can be deposited simultaneously in all feeder pans. This provides adequate feeding access to all of the poultry thereby virtually eliminating the previous problem of the more aggressive birds feeding to the detriment of the less aggressive ones. A second significant and related advantage is the capability of now administering simultaneously, preselected volumes of feed. The frequency of feeding cycles can be set since after each dispersment of feed, the gate on each container is closed and the container is immediately refilled by the trough and related conveyor.

In other narrower but preferred aspects of the invention, a cone-shaped gate is utilized which assists in distributing the feed toward the outer circumferential periphery of the pan where it is most accessable to the poultry. The pan can be provided with a cone-shaped central portion which complements the gate and also urges the feed outwardly at least from the center.

In another aspect, a tubular container having an open top and bottom is suspended from the frame means in telescoped fashion about the feed dispensing container. Preferably this latter container has a cross-sectional dimension substantially larger than the feed dispensing container. By selecting the degree of extension beneath the sides of the pan and the opening of the feed dispenser, the heighth level of feed can be controlled and maintained. Adjustment means are provided to provide flexibility in. Other advantages and improvements will be readily understood from the following description of the preferred embodiment.

DESCRIPTION OF THE DRAWINGS

FIG. 1 is a fragmentary view in perspective of the limit and control feeder apparatus of the subject invention;

FIG. 2 is a fragmentary cross-sectional view of one of the feed pan assemblies in accordance with the subject invention;

FIG. 3 is a fragmentary cross-sectional plan view of the feeder illustrated in FIG. 2 taken generally along line III—III;

FIG. 4 is a cross-sectional view taken generally along line IV—IV in FIG. 3; and FIG. 5 is a fragmentary view of one of the attachment means of the subject invention.

DESCRIPTION OF THE PREFERRED EMBODIMENT

The overall feeding system 10 illustrated in FIG. 1 encompasses a feed storage hopper 12 and feed delivery trough 14 which communicates with hopper 12 at the bottom. Conveyor means 16 in the trough advances feed from the hopper along the trough and is driven by a power means 18 comprising an electric motor and suitable couplings for driving conveyor means 16. Preferably, such conveyor means is an open-center auger, as illustrated, although other types of conveyor means may also be used, such as for example a flat conveyor chain, which is used in feeder systems wherein the feed troughs define closed loops leading away from and back to the hopper means. Likewise, various other types of power arrangements could be utilized and it will be appreciated that while the hopper, trough, conveyor means, power means etc. are essential ingredients to the operation of the overall system, the particular arrangement thereof does not form a specific part of the subject invention.

The system 10 also includes a plurality of individual feeder pan assemblies 20, each connected to the feed trough 14 to receive feed therefrom in a manner which will be more fully set forth hereinafter.

The entire feeder system 10 is preferably suspended freely from overhead, as by means of chain or cable members 22. An electrically charged anti-roost wire 24 is also preferably included, located immediately above feed trough 14 and extending therealong. The feed storage hopper 12 is generally of known type, comprising a walled enclosure which opens at its top to receive fresh supplies of feed and which tapers convergently downward in a generally wedge-shape configuration. The feed trough 14 is tubular in form when the conveyor means 16 therewithin comprises the aforementioned auger, and the latter extends completely through the length of the trough 14 to draw feed from the bottom of the hopper 12 along the entire length of the trough.

One of the feeder pan assemblies 20 is shown in detail in FIGS. 2 and 3. Each assembly 20 is seen to be comprised of a dish-shaped pan 30. Pan 30 is suspended beneath a cover 32 by three circumferentially spaced brackets 34 which extend from cover 32 which in turn is anchored to tubular trough 14 by a bracket or frame assembly 36. The bracket is bolted to the top of cover 34 by a fastener 38 and includes a resilient bracket arm 40 which is shaped to fit over tubular trough 14 and clipped into an opening 42 and a portion of cover 32 opposite the locus of fastener 38. The terminal end of bracket 40 includes a finger portion 44 which catches behind cover 32. The frame assembly 36 also includes bracket shaped couplings 46, 46a which will be described hereinafter with reference to container 50.

Referring specifically to FIG. 2, the tubular or cylindrical shaped container 50 is likewise suspended from tubular trough 14. Container 50 comprises two parts joined together, an upper part 52 and a lower part 54, the lower part telescoping within upper part 52 and being attached thereto by two diametrically opposed brackets 46, 46a, by means of rivets 56 or other fastening means. Brackets 46, 46a, include an outwardly extending arm 58, 58a, which is in turn connected to cover 32 by the threaded fastener 38. Arm 58a includes an opening through which bracket 40 and associated latch finger 44 fits. The upper portion of container part 52 includes a saddle-shaped opening 60 which complements the shape of trough 14 for abutment thereagainst. The upper portion of container portion 52 also includes a general wedge shape illustrated at 62 complementing the slope of bracket 40. The upper end of container 50 is open and in communication with the bottom of trough 14 so that as feed is advanced by conveyor 16 along trough 14, it will be deposited respectively into the respective containers 50 of each of the pan feeder assembly 20.

The bottom or lower extremity 64 of container 50 is also open so that except for the provision of an obstruction in the way of gate member 70, which will be described hereinafter, feed which is advanced through trough 14 into container 50, drops by its own gravitational weight into the bottom of feeding pan 30. The Gate 70 is preferably cone-shaped having an open bottom 71 and is provided for movement between a first position shown in phantom in FIG. 2 wherein it blocks or closes the bottom 64 of container 50. In this position, only measured amount of feed can be dispensed through trough 14 into container 50 equal to the volume of container 50 with gate 70 closed. This amount or volume of course is preselected to achieve the desired amount to be dispensed periodically into feed pan 30.

When gate 70 is lowered into the position shown in FIG. 2, the preselected amount of measured feed in container 50 will drop by its gravitational weight in the direction of arrows 72 onto the bottom of feed pan 30. The lower extremity 74 of feed pan 30 preferably has a conically-shaped upwardly-extending central portion 76 over which cone-shaped gate 70 fits in its lowered position so that as feed slides by gravity down the sloping edges of gate 70, it will also flow gravitationally down the sloping edges of central portion 76 and outwardly into the dished bottom of pan 30 to be eaten by feeding poultry.

The conical gate 70 is suspended by a cable 80 attached at one end to an actuator means illustrated in part by a rod 82 (FIG. 3) which extends the length of trough 14 directly through the dish-shaped cover 32 and upper portion 52 of container 50. As shown in FIGS. 2 and 3, appropriate openings 84 are provided through cover 32 as well as aligned openings 86 through upper portion 52 of container 50.

Attached to rod 82 for each individual feeder pan assembly 20 is a clip 90 (FIGS. 3 and 4) to which is anchored a coil spring 92 which in turn is affixed to one end of cable 80, the other end being attached to the apex of conical gate 70. Cable 80 is threaded through a triangular-shaped guide 94 (FIG. 3) to accommodate the 90 degree change in direction from the vertical to horizontal.

The operation of rod 82 and concurrent operation of each individual cable 80 should be apparent. Sliding movement of rod 82 in the direction illustrated by arrow 96 (FIGS. 3 and 4) will cause expansion of spring 92 and concurrent urgency on cable 80 to lift conical gate 70 up into the closed position illustrated in phantom in FIG. 2. Likewise, movement of rod 82 in a direction opposite to arrow 96 will permit gate 70 to move downwardly into a fully opened position as illustrated in FIG. 2. The utilization of a clip 90 and spring 92 provides flexibility in adjusting the play or tension desired in cable 80. Clip 90 has a pair of openings 98 through which rod 82 easily fits and by squeezing the clip inwardly one end toward the other, adjustment along rod 82 can be easily achieved. Thus, the position of clip 90 and desired tension on spring 92 can be easily adjusted.

Referring now to FIG. 2, an enlarged tubular shield 100 is shown partially encapsulating the lower end of container 50 with the bottom of shield 100 resting near the bottom of pan 30. The tubular shield 100 has an open top and bottom and is suspended from cover 32 by three bales 102 which are riveted at one end 104 to the underside of cover 32 by a rivet or the like 106 and include a finger portion 108 at the lower end which projects inwardly through the side wall 110 of shield 100 through one of a plurality of alternately spaced openings 112, 112a, 112b, 112c or 112d (FIG. 5). The alternate openings 112, 112a, etc. provide a quick convenient flexible means for adjusting the relative height of shield 100 above the floor of pan 30. The lower terminal end 114 of shield 100 defines a gap g between the terminal end 114 and floor of pan 30. When feed is dispensed through container 50 along the slope of conical gate 70 and further along the slope of the conical central portion 76 of pan 30, its flow path toward the dish-shaped portion 74 of pan 30 must be through the gap g which depending on the height of the terminal end 114 of shield 100 also determines the general depth of the exposed feed F as illustrated in FIG. 2. The shield 100 also provides the additional function of preventing access by the poultry to the internal portion of the pan assembly 20, mainly, the gate member 70. Thus, either feed is exposed to the poultry at the proper place, namely, the dish-shaped portion 74 or there is no ingress presented for the poultry to peck or otherwise attempt to get at the internal central portion of the feed pan assembly. Thus, the utilization of shield 100 in addition to ascertaining the feed depth inhibits any tendency on the poultry's behalf to get into or at the central portion of the feed pan assembly.

Having described the entire assembly in detail, its overall operation and flexibility should be readily understood. Depending on the degree of automation desired, the actuation of rod 82 can be power supplied and sequenced with a timer to permit positive sequential intermittent feeding of the poultry. The entire operation can be and is preferably automated such that upon each dispensing cycle, motor 18 is activated to recharge each of the individual container 50. Actuation of rod 82 provides simultaneous dispensing of feed through all of the desired feed pan assemblies in measured amounts thereby greatly facilitating the even distribution of feed and availability to all of the poultry concerned.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. In a poultry feed pan assembly connected to a feed trough having feed advancing means therein and a feed dispensing pan suspended beneath said trough, the improvement comprising: a feed accumulating container suspended beneath said trough above the bottom of said pan, said container communicating with said trough and having an opening above said pan; gate means movable relative said opening between a closed and open position whereby when said gate means is in said closed position, said container is filled with feed from said trough and when said gate means is open, a predetermined amount of feed is dispensed by gravity from said container into said pan said gate means being cone-shaped and having a base diameter greater than the diameter of said opening whereby said container bottom is closed when said cone-shaped gate means is raised into abutting engagement with the bottom of said container; and acutator means for moving said gate means between said opened and closed positions.

2. The improvement according to claim 1 wherein said container is tubular shaped having an open top positioned beneath an opening in the bottom of said trough.

3. The improvement according to claim 1 wherein said pan includes a raised cone-shaped central bottom portion, said cone-shaped gate having an opened bottom, said container being opened by lowering said cone into the proximity of said central portion of said bottom whereby the feed is dispensed out of said container and deflected along the walls of said cone-shaped gate and further along the walls of said central portions of said pan bottom.

4. The improvement according to claim 3 wherein said assembly includes a plurality of feed pans and associated containers suspended beneath said trough spaced apart from each other, each of said cone-shaped gate means being interconnected by said actuator means for raising and lowering of each of said gate means simultaneously such that measured amounts of feed are simultaneously deposited in each of said pans when said gate means are lowered.

5. The improvement according to claim 4 wherein said actuator means comprises a rod-like means extending the length of said trough and a plurality of individual cables, one each for each pan assembly, said cables being attached at one end to said rod-like means and at the other end to said gate means whereby transverse movement of said rod-like means provides simultaneous raising or lowering of said gate means.

6. The improvement according to claim 5 wherein adjustment means are provided for each of said cables to position and tension said cables and associate gate means relative said rod-like means.

7. The improvement according to claim 1 wherein said assembly further includes a tubular shield surrounding at least the lower portion of said container and extending downwardly toward said pan the lower margin of said shield being spaced from said pan defining an annular opening, and adjustment means for suspending said shield at selective heights above said pan, whereby the depth of feed exposed in said pan to poultry is preselected by the height of the lower margin of said shield, said shield further shielding the interior of said pan assembly from the poultry.

8. A feeder pan assembly connected to a trough, said assembly including a feed-accumulating housing wherein a preselected quantity of feed may be accumulated and a feed-dispensing pan from which the poultry may take feed, said accumulating housing having a top portion with an opening communicating with an opening in the bottom of the trough and a bottom portion with an opening communicating with said dispensing pan to replenish feed therein; and gate means cooperative with said opening in said bottom and movable between a closed and open position whereby when said gate means is in said closed position, said housing is filled with feed from said trough and when said gate means is open, said volume of feed collected in said housing is dispensed by gravity into said pan said bottom opening in said housing being circular and said gate means being cone-shaped and having a base diameter greater than the diameter of said bottom opening whereby said housing is closed when said cone-shaped gate means is raised into abutting engagement with the bottom of said housing; and actuator means for moving said gate means between said open and closed position.

9. The feeder pan assembly according to claim 8 wherein a plurality of feed-accumulating housing, feed dispensing pans and cone-shaped gate means are spaced from each other along said trough, each of said cone-shaped gate means being interconnected by said actuator means for raising and lowering of each of said gate means simultaneously between said open and closed positions such that measured amounts of feed are simultaneously deposited in each of said pans when said gate means are lowered.

10. The feeder pan assembly according to claim 9 wherein said actuator means comprises a rod-like means extending the length of said trough and a plurality of individual cables, one each for each pan assembly, said cables being attached at one end to said rod-like means and at the other end to said gate means whereby transverse movement of said rod-like means provides a simultaneous raising or lowering of said gate means.

11. The pan assembly according to claim 8 wherein said assembly further includes a tubular shield surrounding at least the lower portion of said housing and extending downwardly toward said pan, the lower margin of said shield being spaced from said pan defining an annular opening, and adjustment means for suspending such shield at selective heights above said pan, the depth of feed exposed in said pan to poultry being preselected by the height of the lower margin of said shield.

12. A feeder pan assembly comprising a cover member for suspension from a feed trough; a dish-shaped feed pan suspended from said cover member; a feed-accumulating container anchored to said cover member for communication with the trough and having a bottom opening; gate means disposed at the bottom of said container movable between an open and closed position, the bottom of said container being spaced above said pan such that when said gate means is closed, said feed-accumulating container is filled with feed and when said gate means is open, a preselected amount of feed is dispensed by gravity from said container into said pan, said gate means comprising a cone shape and having a base diameter greater than the diameter of said bottom opening; and actuator means for moving said gate means between said open and closed position.

13. The feeder pan assembly according to claim 12 wherein said gate means and feed accumulating housing are shielded by a shield member encapsulating at least the lower portion of said container, said shield means being adjustably suspended from said cover member at varying heights above the bottom of said pan.

* * * * *